United States Patent
Reed et al.

(12)

(10) Patent No.: US 11,166,482 B2
(45) Date of Patent: Nov. 9, 2021

(54) MODULAR PRODUCE DRYING TUNNEL AND METHODS OF USE

(71) Applicants: Lorin Reed, Kingsburg, CA (US); Jim Moshier, Visalia, CA (US)

(72) Inventors: Lorin Reed, Kingsburg, CA (US); Jim Moshier, Visalia, CA (US)

(73) Assignee: PACKLINE TECHNOLOGIES, INC., Kingsburg, CA (US)

( * ) Notice: Subject to any disclaimer, the term of this patent is extended or adjusted under 35 U.S.C. 154(b) by 97 days.

(21) Appl. No.: 16/575,383

(22) Filed: Sep. 18, 2019

(65) Prior Publication Data

US 2020/0085085 A1 Mar. 19, 2020

Related U.S. Application Data

(60) Provisional application No. 62/732,581, filed on Sep. 18, 2018.

(51) Int. Cl.
| | |
|---|---|
| *F26B 25/06* | (2006.01) |
| *A23L 3/40* | (2006.01) |
| *F26B 21/10* | (2006.01) |
| *F26B 3/04* | (2006.01) |
| *F26B 15/18* | (2006.01) |

(52) U.S. Cl.
CPC ........ *A23L 3/40* (2013.01); *F26B 3/04* (2013.01); *F26B 15/18* (2013.01); *F26B 21/10* (2013.01)

(58) Field of Classification Search
CPC .. A23L 3/40; F26B 21/10; F26B 21/12; F26B 3/04; F26B 15/18; F26B 25/066; F26B 19/005; F26B 17/04

USPC ........ 34/216, 217, 215, 212, 209, 207, 208, 34/202, 666, 201, 523
See application file for complete search history.

(56) References Cited

U.S. PATENT DOCUMENTS

| | | |
|---|---|---|
| 1,900,974 A | 3/1933 | Bozarth |
| 3,908,533 A * | 9/1975 | Fagerstrom .............. A21B 3/07 99/386 |
| 4,155,293 A | 5/1979 | Spiel et al. |
| 4,831,747 A * | 5/1989 | Roos ....................... F26B 21/12 34/216 |
| 6,442,866 B2 | 9/2002 | Wefer |
| 6,523,276 B1 | 2/2003 | Meldrum |

(Continued)

FOREIGN PATENT DOCUMENTS

| | | |
|---|---|---|
| WO | 199904209 | 1/1999 |
| WO | 2016151446 | 9/2016 |

OTHER PUBLICATIONS

Cooling Tunnels, Product Page, Retrieved on Sep. 19, 2019 https://peshcherin.com/specification/cooling-tunnels.

*Primary Examiner* — John P McCormack
(74) *Attorney, Agent, or Firm* — Sierra IP Law, PC; William K. Nelson

(57) ABSTRACT

A modular produce drying tunnel system comprising a loading module, at least one drying module, an end module, and a conveyor. The drying module may comprise at least one gullwing style access door which houses an independent heating element and a blower and which opens upwardly to provide broad access to the interior of the tunnel. The system may be customizable for different types and volumes of produce, comprising a plurality of drying modules, each having at least one access door, and each access door having an independent heating element and blower.

27 Claims, 9 Drawing Sheets

(56) References Cited

U.S. PATENT DOCUMENTS

| | | | | |
|---|---|---|---|---|
| 9,332,772 B2* | 5/2016 | Muhlherr | ............... | F26B 23/002 |
| 2005/0039608 A1* | 2/2005 | Sollich | ..................... | A23G 7/02 |
| | | | | 99/352 |
| 2008/0019819 A1* | 1/2008 | Reed | ................... | B65G 57/303 |
| | | | | 414/791.6 |
| 2008/0282719 A1* | 11/2008 | Fung | ...................... | F25D 17/06 |
| | | | | 62/255 |
| 2014/0259733 A1* | 9/2014 | Blomquist | ............. | F26B 15/00 |
| | | | | 34/500 |
| 2018/0149428 A1* | 5/2018 | Kolari | .................... | F26B 21/04 |
| 2019/0234686 A1* | 8/2019 | Brodie | ................ | F26B 21/004 |

\* cited by examiner

MODULAR PRODUCE DRYING TUNNEL AND METHODS OF USE

FIELD OF THE INVENTION

The present invention relates to novel drying systems for freshly washed produce. More particularly, embodiments of the present invention pertain to a modular produce drying tunnel and conveyor wherein each drying module comprises its own access doors with independent heating and blowing elements.

DISCUSSION OF THE BACKGROUND

Many farmers and farming companies which grow fresh produce (e.g., fruit and vegetables) need to wash their produce upon harvesting it in order to remove residual soil and other debris prior to delivering the produce to market. The produce must then be substantially dried before being packed, as the packing containers are often made from cardboard or other materials which may lose integrity when wet. Also, drying produce reduces the chance of bacteria or mold growing on the produce in transit. However, letting produce air dry is time consuming and inefficient, while the attractiveness of the produce to a consumer is derived from its freshness and perceived ripeness. Thus, the value of the produce to the farmer reduces significantly with any delay in delivering the produce to market once it is harvested. Often the volume of produce to be washed and then dried in such a short time is sufficiently large that performing such tasks by hand is virtually impossible, and prohibitively expensive. Therefore, in order to quickly and effectively dry large volumes of freshly washed produce, automated systems are necessary.

One current automated produce drying system involves a tunnel which blows heated air over the produce while it is conveyed through the tunnel on a conveyor. Such systems are typically either fully enclosed tunnels or they involve relatively small doors allowing access to the interior of the tunnel. Such systems also typically involve a centralized heat source and non-adjustable fans in a tunnel which cannot be extended or otherwise customized in order to optimize the drying process for a particular type of produce. Because different fruits and vegetables have different sensitivities to heat and/or fast-moving air, it may be preferable to increase or decrease the level of heat or the speed of the fans. It may also be beneficial to have a hotter environment at the beginning of the tunnel as compared to the end, or vice versa. Being able to vary the speed of the conveyor may also add to the optimization of a drying cycle for a particular type of produce. Finally, providing large doors which allow broad access to the interior of the tunnel would aid in determining the most effective drying process for a particular type of produce, and would make maintenance and cleaning of the tunnel more efficient. Current systems fail to provide these aspects, and thus are not efficient for drying a variety of different types of produce while preserving their freshness and value to both the consumer and the farmer.

It is therefore desirable to provide a novel modular produce drying tunnel system that addresses such issues.

SUMMARY OF THE INVENTION

General Overview

The present invention relates to a system for drying and/or washed, fresh produce with a modular tunnel and conveyor system, each tunnel module having independent heating and/or cooling elements and an air circulation device (e.g., a fan or blower), such that the system is scalable for higher volume and/or more intensive produce drying and/or cooling operations. It is to be understood that the present system is capable of drying and/or cooling a broad range of produce, such as citrus fruit, stone fruit, berries, cherries, olives, avocados, tomatoes, peppers, lettuce and other leaf vegetables, squash, asparagus, beans, peas, onions, eggplant, and other similar fruits and vegetables.

The tunnel may be scalable such that drying modules may be added or removed from the system, depending on the desired throughput of produce and other requirements for a specific produce drying and/or cooling operation. For instance, some produce drying and/or cooling jobs may involve a large volume of delicate or heat sensitive produce, requiring a long tunnel (i.e., four or more drying modules) running at relatively low temperatures (e.g., about 70° F. to about 90° F., or any value or range of values therein) and blower speeds (e.g., about 300 to about 500 feet per minute), and optionally including a cooling section to bring the produce temperature down after drying. Other produce drying jobs may involve a smaller throughput of heartier produce (e.g., melons, citrus, etc.). The system may therefore be modified such that a lesser number of drying modules are included in the tunnel (i.e., two or three drying modules), wherein each drying module may run at a higher temperature (e.g., about 80° F. to about 110° F., or any value or range of values therein) and blower speed (e.g., about 400 to about 1000 feet per minute). In some embodiments, one or more modules may be utilized for heating and drying produce in a proximal module or zone of the tunnel and modules or zone at the distal end of the tunnel may be used for cooling. For example, one or more modules at the end of the tunnel may be used for cooling produce and may run at cooling temperatures (e.g., about 35° F. to about 75° F., or any value or range of values therein) and blower speeds operable to dissipate heat from the produce (e.g., about 400 to about 1000 feet per minute, or any value or range of values therein). Other drying and/or cooling processes may require multiple zones with different temperature and air speed conditions in each zone, where each zone may include one or more modules. Yet other produce drying or cooling jobs may call for other combinations of tunnel modules and other temperature and blower settings on each tunnel module.

Each drying module of the tunnel may comprise at least one access door for providing access to the interior of the tunnel, each access door having an independent heating element and blower. Thus, each drying module in the system may be set at a different temperature, allowing for a more nuanced produce drying process. The system may be set up such that the initial drying module runs at a high temperature in order to accelerate the drying process, and subsequent drying modules may each run at a lower temperature than the last, to prevent cooking the produce as surface moisture is incrementally eliminated. In some embodiments, the access door may comprise a temperature probe operable to detect the temperature in the interior of the drying module and relay the temperature information to a control interface.

The control interface may comprise a visual display operable to display to a user the temperature in the interior of the drying module. The control interface may further comprise a central processing unit, the central processing unit being operable to automatically adjust at least one of the temperature of a heating element and blower speeds, based on the information from the temperature probe, in order to raise or lower the temperature in the interior of the drying module.

In one embodiment, the blower of the initial drying module may be set at a high level in order to mechanically remove water from soaked produce, while the heating element of the initial drying module is set at a relatively low temperature. Subsequent drying modules may run at reduced blower speeds and increased heating element temperatures in order to remove residual moisture from the produce. For further zone differentiation within the tunnel for different produce drying or cooling jobs, the modules may each have independent conveyors, which may be a belt, chain, rollers, wheel conveyors, or other conveying mechanism powered by one or more motors operable to vary the speed of the belt, increasing or decreasing the time in which produce passes through each tunnel module. For example, a first module may have a relatively slow conveying speed (e.g., in a range of about 2 to about 10 feet/minute) in combination with a relatively low heating temperature (e.g., about 80° F. to about 100° F., or any value or range of values therein) and a high blower speed (e.g., about 600 to about 1000 feet/minute, or any value or range of values therein), in order to remove a majority of the water on the produce by blowing it off of the fruit, reducing the amount of time that the produce will need to be exposed to hotter/evaporative conditions.

The system may also have a fluid inlet conduit with an inlet coupling device in fluid communication with a hot or cooled fluid source (i.e., a water heater or boiler, a source of refrigerated water, etc.), and a water outlet conduit with an outlet coupling device in fluid communication with either a drain system or fluid return pipe which leads back to the hot or cooled fluid source. The fluid inlet conduit and the fluid outlet conduit may each span the length of the tunnel such that the fluid inlet pipe(s) of each tunnel module of the tunnel may hook up to the same fluid inlet conduit, and the fluid outlet pipe(s) of multiple tunnel modules may hook up to the same fluid outlet conduit. This embodiment allows for a single hot fluid source to feed all radiating elements of the system (also referred to herein as temperature control elements and heating elements), though each radiating element of the system may be operable to vary the volume of fluid flowing through it, thereby controlling the heat radiated or absorbed by the fluid in the radiating element and the air temperature in the tunnel module's heat transfer chamber. In some embodiments, one or more of the tunnel modules may include two or more radiating elements therein to allow for one to be connected to a cooled fluid source and performing a cooling function and another to be connected to a heated fluid source and performing a drying/heating function. The inclusion of at least one radiating element for cooling and at least one radiating element for drying/heating allows a module to be switched between drying and cooling functions. Each of the radiating elements may include a flow rate control valve. The system controller may be operable to control the flow rate control valves for each of the modules. This may allow the system controller to alter the function of each module between a heating/drying function to a cooling function.

The system may also include a loading module and an end module. The loading module may be at proximal end of the system into which produce may be loaded into the system. The fruit may be loaded onto the conveyor by a feeding mechanism. The end module may be in proximity to a receiving conveyor for passing the dried produce to a backend packing system. Each of the loading module and the end module may further include a barrier which is passable by the produce on the conveyor, but which substantially blocks air flow into or out of the tunnel, allowing for improved control of temperature and air flow within the tunnel. For example, the barrier may comprise rubber, plastic, or fabric flaps.

The access door of each drying module may be a gullwing style door which swings upward, providing a broad opening to the interior of the drying module. A user may thus access the drying module interior, the conveyor, and any produce which may be in the drying module by simply lifting the access door, providing easy access for sampling, maintenance, and cleaning.

Each access door may house at least one radiating element and a blower, and each door may have a kill switch such that when the access door is opened, the blower and/or the heating element shuts off. The kill switch may be adapted to only shut off the components of the access door that is opened, or it may be adapted to shut off the components of the access door and the conveyor, allowing the other drying modules to continue drying produce. In still further embodiments, the kill switch may be adapted to shut down the entire system for safety purposes. The kill switch may be operable to cause the components which were shut down by the kill switch to automatically resume their function(s) when the access door is returned to a closed position.

Elements of Drying/Cooling Tunnel

The present invention provides a modular tunnel system for drying washed, fresh produce. The system may comprise at least one drying module, a loading module and an end module, and a conveyor. The at least one drying module may house a heating element and a blower. The system may further comprise a water inlet conduit having an inlet coupling device, and a water outlet conduit having an outlet coupling device.

The drying module may comprise a module support and an access door, the access door having an outer shell to protect and enclose the components in the access door, and a handle for opening the access door. The access door may comprise at least one of a metal, a metal alloy, a plastic material, a rubber material, a carbon fiber material, and another similar material. The access door may comprise a heating chamber which houses a heating element and blower, the blower being disposed so as to blow heated air from the heating chamber into an interior of the drying tunnel. In some embodiments, the access door may comprise a gullwing style door which opens upwardly. In other embodiments, the access door may open in a direction parallel to or at an oblique angle to the ground.

In some embodiments, the module support may comprise a central support, a one or more couplings (e.g., a first coupling, and a second coupling, the couplings being disposed on opposite sides of the module support). The module support may comprise at least one of a metal, a metal alloy, a plastic material, a rubber material, a carbon fiber material, and another similar material. In some embodiments, the access door may be secured to the central support. In other embodiments, the access door may be secured adjacent to the central support, on the coupling at the end of the drying module.

The central support may run parallel with the direction of the conveyor and positioned substantially directly above a central axis of the drying module, such that opening the access door uncovers approximately half of the interior of the drying module. In other embodiments, the access door may be secured to a side support, the side support being disposed on one side of the drying module, substantially parallel to the direction of the conveyor, such that opening the access door uncovers substantially all of the interior of the drying module. In such embodiments, the module support may not comprise a central support, and the water intake conduit and water outlet conduit may be secured to the side support. Each access door may have a brace to prop the access door open while a user inspects and/or maintains the interior of the drying module.

In some embodiments, the access door houses a heat transfer chamber, the heat transfer chamber being an enclosed volume within the access door and positioned between the outer shell and the interior of the tunnel module. In some embodiments, the heat transfer chamber may be positioned directly above the conveyor. The heat transfer chamber may house at least one radiating element and at least one blower. In other embodiments, the access door may not comprise a heat transfer chamber, the radiating element and blower being mounted directly to the outer shell and blowing heated or cooled air directly into the interior of the drying module.

In some embodiments, the radiating element may comprise a radiator, which may comprise a circuitous watertight conduit. In some embodiments, the conduit may include fins extending therefrom, the fins providing a high surface area to radiate or absorb heat. In some embodiments, the radiating element may comprise at least one of a metal, a metal alloy, and another similar material which efficiently transfers heat. The radiating element may be operable to allow flow of heated water (e.g., water at a temperature in a range of approximately 140 degrees Fahrenheit to approximately 212 degrees Fahrenheit at sea level) or cooled water (e.g., water at a temperature in a range of approximately 35 degrees Fahrenheit to approximately 75 degrees Fahrenheit at sea level).

In some embodiments, each radiating element may be in fluid communication with a fluid inlet pipe and a fluid outlet pipe. Each of the fluid inlet pipe and the fluid outlet pipe may comprise at least one of a metal, a metal alloy, a polymeric material (e.g., a polymeric rubber material, PVC, etc.), or other appropriate material. The fluid inlet pipe may be in fluid communication with both the radiating element and the fluid inlet conduit, and the fluid outlet pipe may be in fluid communication with the radiating element and the fluid outlet conduit. In embodiments in which each module includes a plurality of radiating elements, each of the radiating elements may include a fluid inlet conduit operable to connect with a fluid inlet pipe and a fluid outlet conduit operable to connect with a fluid outlet pipe.

In other embodiments, the tunnel modules may include a radiating element may be in direct communication with the water inlet conduit and the water outlet conduit. In other embodiments, the heating element may comprise an electrically powered heating element, such as a tubular heating element comprising a resistive heating element clad in an electrical insulator and a metal casing, an inductive heating element that includes an electromagnetic induction device and an outer ferrous cladding that is heated by the induction device as the magnetic field of the induction device is oscillated by a controller, or other suitable electrical heating elements. In yet other embodiments, the heating element may include one or more gas (i.e., propane or natural gas) burners. In some embodiments, the heating chamber may house a plurality of heating elements.

In some embodiments, the system may comprise an electronic controller, the controller being operable to adjust the temperature in a module by increasing the flow of fluid through the radiating element. The controller may include a central processing unit and a digital control interface. The control interface may be operable to control a plurality of tunnel modules connected in series for various applications. The control interface may be operable to apply independent control parameters to each of the tunnel modules or zones of tunnel modules to establish various condition zones in the connected tunnel modules. The control interface may be programmable to establish independent parameters for each tunnel module (e.g., flow rates of hot water, varying fan rates, etc.), allowing predetermined zones in the modular tunnel system that apply an optimized sequence of conditions for a particular kind of produce. The control interface may include multiple independent zone controller interfaces, which may be presented as separate control widgets (e.g., graphical boxes that include various parameter level adjustment functions for controlling temperature, blower speed, and conveyor speed within a module) within one or more graphical user interfaces.

The control interface may also include a programmable memory, and the user interface may be used to create multiple sets of control parameters for the heating modules and store each set of control parameters as a pre-programmed set of computer executable instructions that the control interface may implement when selected by a human operator. Programming of the controller can alternatively be done by connecting it to a personal computer through an USB port or the like, or remotely through data connection to the internet. The multiple sets of control parameters may each be tailored to a particular kind of produce (e.g., apples, citrus, etc.), a particular condition of the produce (e.g., pre-conditioned, breaking, ripe, etc.), or other basis.

The control interface may be in electronic communication with control valve structures in each module that control the movement of heated or cooled fluid from a fluid source into the radiating element(s) within each module. The control valve structures may be electrically activated flow control valves that can be used to provide a specific and independent flow rate of fluid (heated or cooled) through the radiating elements of each module. The control parameters may include different temperature conditions in two or more modules or groups of modules (zones), and the controller may execute such temperature control parameters by controlling the fluid flow through the radiating element(s) by incremental control of the flow control valves. The controller may be programmed with calibrated flow control valve flow aperture areas that correspond to temperature levels within the modules.

In some embodiments, the control interface may comprise a one or more rotatable dials or other mechanical switch to control the temperature level (e.g., hot water flow rate) through each of the tunnel modules. In some embodiments, the heating control interface may control a valve, the valve being operable to increase or decrease the volume of heated fluid flowing into the radiating element. In other embodiments, the heating control interface may control the level of electric current flowing into a heating element.

In some embodiments, the system may comprise a single water inlet conduit with an inlet coupling device in fluid communication with a fluid source and a single fluid outlet conduit with an outlet coupling device in fluid communication with either a drain system or fluid return pipe which leads back to the fluid source. Each of the fluid inlet conduit and the fluid outlet conduit may comprise a watertight pipe comprising at least one of a metal, a metal alloy, a plastic material (e.g., a PVC pipe), a rubber material, a carbon fiber material, and another similar material. The fluid inlet conduit and the fluid outlet conduit may each span the length of the drying tunnel such that the fluid inlet pipe(s) of each tunnel module of the tunnel may hook up to the same fluid inlet conduit, and the fluid outlet pipe(s) of each tunnel module may hook up to the same fluid outlet conduit. In other embodiments, each tunnel module may have an independent fluid inlet coupling device and an independent fluid outlet coupling device.

In some embodiments, the blower may comprise an electric fan powered by a power source (e.g., a 120V, 220V, or 240V wall outlet, or a generator), the fan being disposed to blow heated or cooled air from the heat transfer chamber into the interior of the drying module. In some embodiments, the blower may comprise a commercially available electric fan. In some embodiments, the fan may be mounted within a passage between the heat transfer chamber and the interior of the tunnel module. In other embodiments, the fan may be mounted within the heat transfer chamber and may blow air into a air flow conduit, the air flow conduit leading out of the heat transfer chamber and into the interior of the tunnel module. In some embodiments, the air flow conduit may be operable to be aimed in a plurality of directions within the interior of the tunnel module. In some embodiments, the heat transfer chamber may house a plurality of blowers, each disposed to blow heated or cooled air from the heat transfer chamber into the interior of the tunnel module.

In some embodiments, the controller may be operable to control the blower operation of each module, particularly the speed of the blower. In some embodiments, the controller may be operable to control the direction of the blower. The control interface may allow a user to manipulate the blower speed settings of each module within the control widget for the particular tunnel module. In other embodiments, the control interface may have a dial or other mechanical switch. In some embodiments, each access door may include a control interface operable to control radiating elements and a blower of the tunnel module.

In some embodiments, the access door may comprise a single heating chamber. In other embodiments, the access door may comprise a plurality of heat transfer chambers, each heat transfer chamber housing at least one radiating element and at least one blower. In one embodiment, each drying module may comprise two access doors, each access door comprising at least one heat transfer chamber, and each heat transfer chamber comprising at least one radiating element and at least one blowers.

In some embodiments, each drying module may comprise a plurality of access doors. Each drying module may comprise a first access door on a first side of the drying module and a second access door on a second side of the tunnel module. In other embodiments, the tunnel module may comprise a first plurality of access doors on the first side of the drying module and a second plurality of access doors on the second side of the tunnel module.

Each tunnel module may comprise a first end and a second end. In some embodiments, the first end may be the upstream end with regard to the movement of the top side of the conveyor, the second end being the downstream end. The first end and the second end may each comprise a coupling for attaching to an adjacent module. The coupling of the first end may be operable to attach to a coupling of either an adjacent drying module or a loading module, and the coupling of the second end may be operable to attach to a coupling f either an adjacent drying module or an end module. For example, the couplings may include latches (e.g., toggle latches or clamps) that connect the modules end-to-end at their lateral sidewalls and/or at connection points on the topside and/or underside of the modules.

In some embodiments, the couplings may encompass the entire cross-sectional perimeter of an end of a module and may create an airtight seal with adjacent module when adjacent modules are secured together. In some embodiments, the couplings may include nesting ends of two adjacent modules, where a first module may have a recess along a proximal edge of its frame and a second module may have a complementary protrusion along the distal end of its frame that seals within the recess to establish a snug and airtight fit between the modules. Engagement of the couplings seals the nested, adjacent ends of the modules of the together. In some embodiments, the modules may include a compressible gasket positioned between the nested, adjacent ends of the modules.

In some embodiments, each drying module may comprise a drip pan mounted underneath the conveyor, the drip pan being operable to catch droplets of moisture which fall off of the produce and/or conveyor as it passes through the drying module. Each drip pan may comprise a drain hole in fluid connection with a drain conduit which leads to a waste fluid disposal system (i.e., a sewage pipe).

The loading module may comprise an outer shell having a coupling operable to be secured to a coupling of an adjacent tunnel module, a barrier disposed between the outer shell and the conveyor, and a drive shaft in mechanical connection with a conveyor motor for powering the conveyor. The barrier may be operable to allow produce to pass into the drying tunnel while substantially blocking air flow from passing into or out of the interior of the adjacent drying module. In some embodiments, the barrier may be a row of plastic strips secured to the shell and hanging above the conveyor. In other embodiments, the strips may comprise at least one of a cloth material, a rubber material, or another similar material. In other embodiments, the barrier may comprise a wall of air (i.e., a narrowly directed flow of air blowing from the shell down onto the conveyor). In yet other embodiments, the barrier may comprise a wall of water (i.e., a substantially unbroken laminar flow of water falling from the shell to the conveyor). The loading module may further comprise a loading shelf for catching washed produce being loaded into the modular tunnel from a separate washing or conveying device, or produce being loaded by a user, and directing the produce to the conveyor.

The conveyor motor may comprise any motor appropriate for driving a drive shaft to cycle the conveyor. In some embodiments, the motor may comprise an electric motor. In some embodiments, the electric motor may be powered by a power source (e.g., a 120V, 220V, or 240V wall outlet, or a generator). In some embodiments, the electric motor may comprise an induction motor with a 220V power supply and an output in a range from approximately 3 kW to approximately 15 kW. The motor may comprise a commercially available electric motor (e.g., an Emean Electric Machinery Co. YC series 3 kW electric motor). In other embodiments, the motor may comprise an internal combustion motor. In yet other embodiments, the motor may comprise another similar type of motor. The motor may be mechanically connected to the drive shaft. In some embodiments, the motor may be connected to the drive shaft via an axle. In other embodiments, the motor may be connected to the drive shaft via a pulley and a belt or chain.

In other embodiments, each module may have an independently controlled conveyor, each module including a separate conveyor motor. The conveyor motor of each module may be in electronic communication with the controller and the speed of the conveyor may be controlled by a user through the control interface. The control interface may allow a user to manipulate the conveyor speed settings of each module within the control widget for the particular tunnel module.

The conveyor may comprise a belt or chain, and may comprise at least one of a rubber, a plastic, and a metal. The conveyor may have a width sufficient to convey a range of different sizes and volumes of produce though the drying tunnel (e.g., in a range of about 12 inches to about 60 inches, such as in a range of about 24 inches to about 48 inches, or any vale therein). The conveyor may have a width substantially equal a length of the drive shaft and may be wrapped about both the drive shaft and the tail shaft of the end module. The motor may cause the drive shaft to rotate, causing the conveyor may cause the conveyor to cycle (i.e., revolve) around the drive shaft and tail shaft. In some embodiments, the conveyor may be a chain. The conveyor may comprise a plurality of openings adapted to allow moisture and air to pass through the conveyor (i.e., water droplets falling from the produce, and heated air being blown onto the produce by a blower) while supporting the produce in place.

The end module may comprise an outer shell having a coupling operable to be secured to a coupling of an adjacent tunnel module, a barrier disposed between the outer shell and the conveyor. The barrier may be operable to allow produce to pass out of the modular tunnel while substantially blocking air flow from passing into or out of the interior of the adjacent drying module. In some embodiments, the barrier may be a row of hanging strips comprising at least one of a plastic material, a cloth material, a rubber material, or another appropriate material. In other embodiments, the barrier may comprise a wall of air (i.e., a narrowly directed flow of air blowing from the shell down onto the conveyor).

In some embodiments, the end module may comprise a first free-spinning tail shaft and a second free-spinning tail shaft, wherein the second free-spinning tail shaft is disposed below and is recessed in relation to the first free-spinning tail shaft, such that the pathway of the conveyor may comprise an inverted incline, which may allow sticky produce more time to fall off of the conveyor.

In one aspect, the present invention may provide a modular tunnel system for drying produce, comprising: a loading module; a drying module having an access door; an end module, and a conveyor. In some implementations, the access door comprises a heating element and a blower. In some implementations, the access door further comprises a heating chamber, the heating chamber housing the heating element and the blower. In some implementations, the access door comprises a gullwing-style door which opens substantially vertically. In some implementations, opening the access door uncovers approximately half of an interior of the drying module. In some implementations, opening the access door uncovers substantially all of an interior of the drying module. In some implementations, the system further comprises a water inlet conduit and a water outlet conduit, wherein the heating element is heated by a flow of hot water. In some implementations, the heating element comprises a valve for controlling the flow of hot water. In some implementations, the heating chamber comprises a plurality of blowers. In some implementations, the access door comprises a plurality of heating chambers. In some implementations, the drying module comprises a plurality of drying modules connected in series via a plurality of couplings. In some implementations, each of the plurality of drying modules comprises a plurality of access doors. In some implementations, the system further comprises a control interface, wherein the control interface is operable to adjust a level of heat of the heating element. In some implementations, the system further comprises a control interface, wherein the heating element and the plurality of blowers of each access door are controlled independently. In some implementations, the system further comprises a control interface, wherein the heating element and the plurality of blowers of each heating chamber are controlled independently. In some implementations, the loading module comprises a drive shaft to turn the conveyor, the drive shaft being powered by a motor. In some implementations, the loading module comprises a first barrier for substantially blocking a first air flow and the end module comprises a second barrier for substantially blocking a second air flow.

In a second aspect, the present invention may provide a system for drying produce including a modular tunnel, the modular tunnel comprising: a loading module for loading produce into the modular tunnel, the loading module comprising a first barrier for substantially blocking a first air flow while allowing the produce to pass into the modular tunnel, a drive shaft for causing a conveyor to revolve, a motor for turning the drive shaft, and a loading shelf for directing the produce to the conveyor; a plurality of drying modules for drying the produce, each drying module comprising a gullwing-style access door, the access door providing access to at least approximately half of an interior of the drying module when open and comprising a heating chamber having a heating element and a blower for blowing heated air onto the produce; and an end module comprising a second barrier for substantially blocking a second air flow while allowing the produce to pass out of the modular tunnel and a free-spinning tail shaft for the conveyor to wrap around; wherein the loading module connects to a drying module of the plurality of drying modules via a first coupling, two drying modules of the plurality of drying modules connect via a second coupling, and the end module connects to a drying module of the plurality of drying modules via a third coupling.

In a third aspect, the present invention may provide a method of using a modular produce drying tunnel, comprising the steps of: connecting the loading module to the drying module via a first coupling; connecting the drying module to the end module via a second coupling; installing the conveyor around the drive shaft and the tail shaft; connecting the water inlet conduit to a hot water source; connecting the blower to a power source; and loading produce onto the conveyor at the loading module. In some implementations, the drying module comprises a plurality of drying modules, the heating element and the blower of each of the plurality of drying modules being independently controlled via at least one control interface, and the method further comprises the steps of: connecting the plurality of drying modules to each other via a third coupling; and adjusting a heating setting of each of the heating elements and a speed setting of each of the blowers.

It is an object of the present invention to provide improved produce drying system which is modular and scalable.

It is also an object of the present invention to provide improved produce drying tunnel system which is customizable in temperature level and speed of air delivered to the produce.

It is also an object of the present invention to provide improved modular tunnel system operable to heat or cool a material passed therethrough with customizable temperature zones and speed of air delivered to the material.

It is also an object of the present invention to provide improved produce drying tunnel system which is operable to both heat and dry produce and then cool the produce down to remove moisture from the exterior of the produce while minimizing the heat exposure of the produce to minimize chemical changes or cooking of the produce.

It is also an object of the present invention to provide improved produce drying tunnel system which can vary the temperature level and speed of air delivered to the produce from one drying module to the next.

It is also an object of the present invention to provide improved produce drying tunnel system which provides broad access to the interior of the tunnel, allowing for more effective monitoring of the produce, and maintenance of the tunnel.

It is also an object of the present invention to provide improved produce drying tunnel system which provides a coupling system between modules, allowing for additional drying modules to be added between current drying modules.

It is also an object of the present invention to provide improved produce drying tunnel system which increases safety by automatically stopping heating components upon opening an access door.

Additional aspects and objects of the invention will be apparent from the detailed descriptions and the claims herein.

DETAILED DESCRIPTION

Figure 1A:
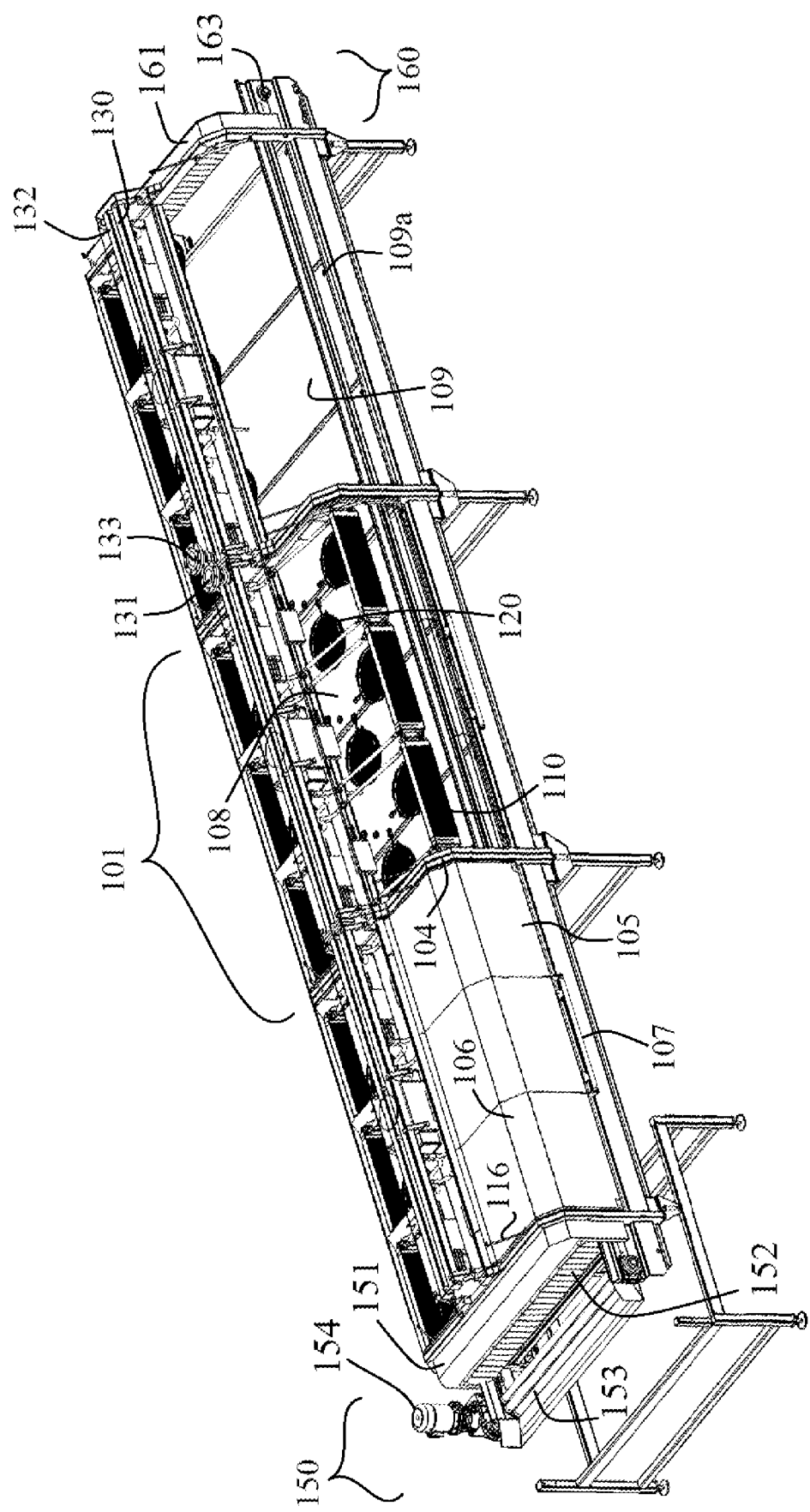
FIG. 1A provides a perspective view of a modular produce drying tunnel system, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims.

In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring to FIGS. 1-5B, it is seen that the present invention includes various embodiments of a modular produce drying tunnel system.

Figure 1B:
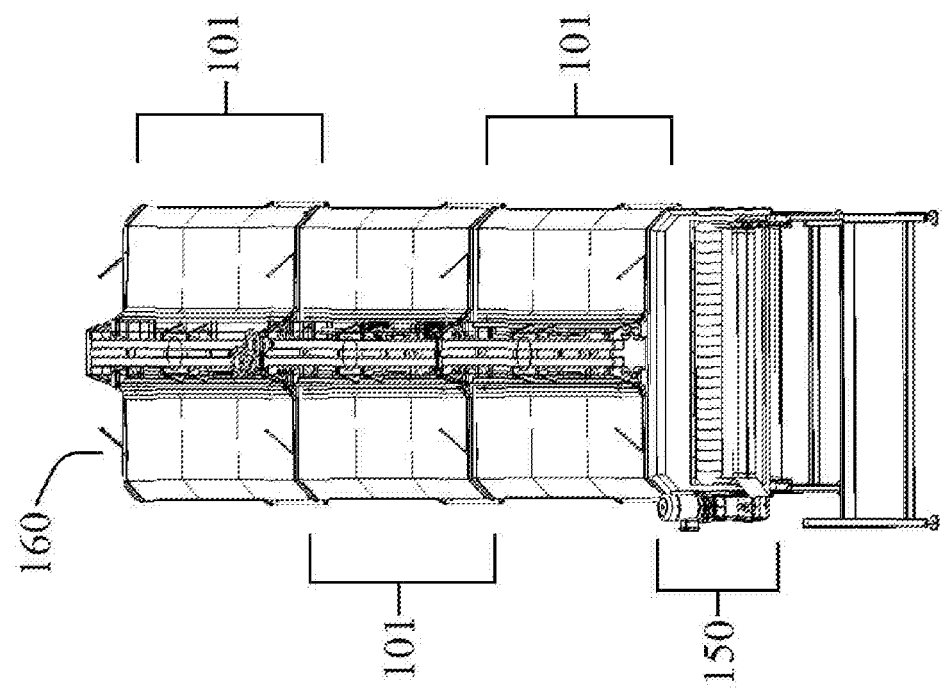
FIG. 1B provides a perspective view of a modular produce drying tunnel system, according to an embodiment of the present invention.

The present invention provides a modular tunnel system 100 for drying washed, fresh produce. The system 100 may comprise at least one drying module 101, a loading module 150, an end module 160, and a conveyor 170 (see FIG. 3A). The at least one drying module 101 may house a heating (or cooling) element 110 (a convoluted pipe operable to pass a fluid therethrough to radiate or absorb heat) and a blower 120. The system may further comprise a water inlet conduit 130 having an inlet coupling device 131, and a water outlet conduit 132 having an outlet coupling device 133. As shown in FIG. 1A, the system 100 may comprise a loading module 150, three drying modules 101 connected in series, and an end module 160. For clarity in showing the internal components of the three drying modules, FIG. 1A depicts the conveyor and various components of the access doors of the three drying modules as either transparent or not shown (e.g., the outer shell 107 of the access door 105 adjacent to the loading module 150 is shown, but no other outer shell 107 of an access door is fully visible). FIG. 1B depicts the same embodiment of the system 100 with all components of the access doors being fully visible.

The drying module 101 may comprise a module support 102 and an access door 105, the access door 105 having an outer shell 106 to protect and enclose the components of the access door 105, and a handle 107 for opening the access door 105. The access door may house a heating chamber 108 in which a heating element 110 and blower 120 are mounted, the blower 120 being disposed so as to blow heated air from the heating chamber 108 into an interior of the drying module 101. The access door 105 may comprise a gullwing style door which opens upwardly.

Figure 2A:
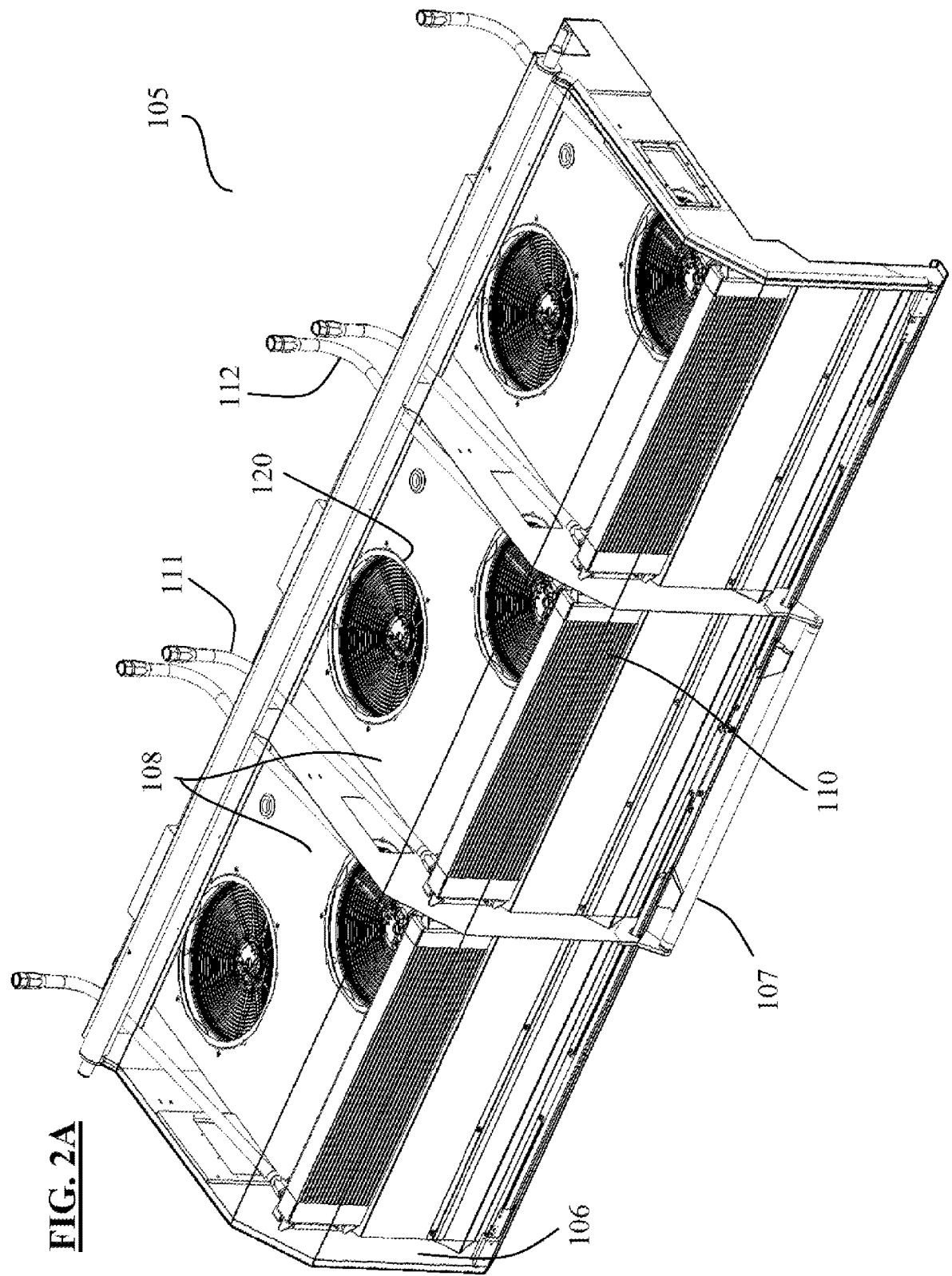
FIG. 2A provides a perspective view of an access door of a modular produce drying tunnel system, according to an embodiment of the present invention.
Figure 2B:
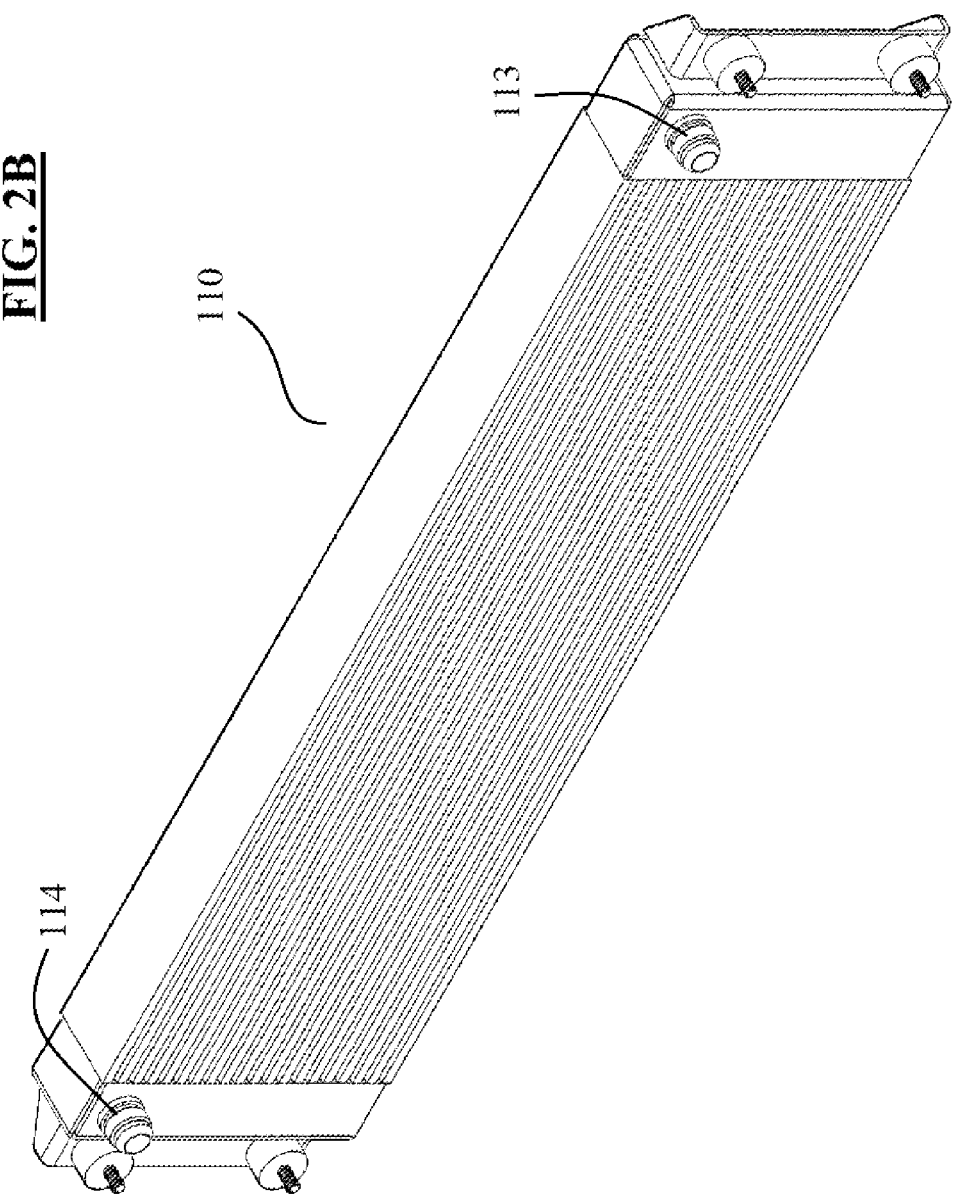
FIG. 2B provides a perspective view of a heating element of a modular produce drying tunnel system, according to an embodiment of the present invention.

As seen most clearly in FIG. 2A, the access door 105 may house the heating chamber 108, the heating chamber 108 being an enclosed volume within the access door and positioned between the outer shell 106 (the outer shell 106 being shown as transparent in FIG. 2A for clarity) and the interior of the drying module 105. The heating chamber 108 may be positioned directly above the conveyor 170 (e.g., see 4) and may house at least one heating element 110 and a plurality of blowers 120, such that heated air may be blown directly down onto produce passing beneath the heating chamber 108 on the conveyor 170. The access door 105 may comprise a plurality of heating chambers 108, each heating chamber 108 housing at least one heating element 110 and a plurality of blowers 120. Each drying module 101 may comprise two access doors 105, each access door 105 comprising three heating chambers 108, and each heating chamber 108 comprising a heating element 110 and a plurality of blowers 120. Each access door may have a brace 116 to prop the access door open while a user inspects the interior of the drying module.

Each heating element 110 of the access door 105 may comprise a radiator heated via a flow of hot water, the heating element 110 heating the air in the heating chamber 108. The heating element 110 may comprise a water inlet pipe 111 and a water outlet pipe 112. The water inlet pipe 111 may be in fluid communication with an inlet 113 (see FIG.

2B) of the heating element 110 and a water inlet conduit 130, and the water outlet pipe 112 may be in fluid communication with an outlet 114 of the heating element 110 and a water outlet conduit 132. The system 100 may comprise a heating control interface (not shown), the heating control interface being operable to adjust the volume of hot water flowing through the heating element 110, and thus the level of heat radiated by the heating element 110.

The system 100 may comprise a single water inlet conduit 130 with an inlet coupling device 131 in fluid communication with a hot water source (not shown) and a single water outlet conduit 132 with an outlet coupling device 133 in fluid communication with at least one of a drain system or water return pipe (not shown) which leads back to the hot water source. The water inlet conduit 130 and the water outlet conduit 132 may each span the length of the drying tunnel such that the water inlet pipes 111 of each drying module 101 of the tunnel may hook up to the same water inlet conduit 130, and the water outlet pipes 112 of each drying module 101 may hook up to the same water outlet conduit 132.

Each blower 120 of the access door 105 may comprise an electric fan, the fan being disposed to blow heated air from the heating chamber 108 into the interior of the drying module 101. The fan may be mounted within a passage between the heating chamber 108 and an interior of the drying module 101. The system 100 may comprise a blower control interface (not shown). The blower control interface may be operable to control the speed of the blower(s) 120, and thus the volume of heated air blown from the heating chamber 108 into the interior of the drying module 101.

Figure 2C:
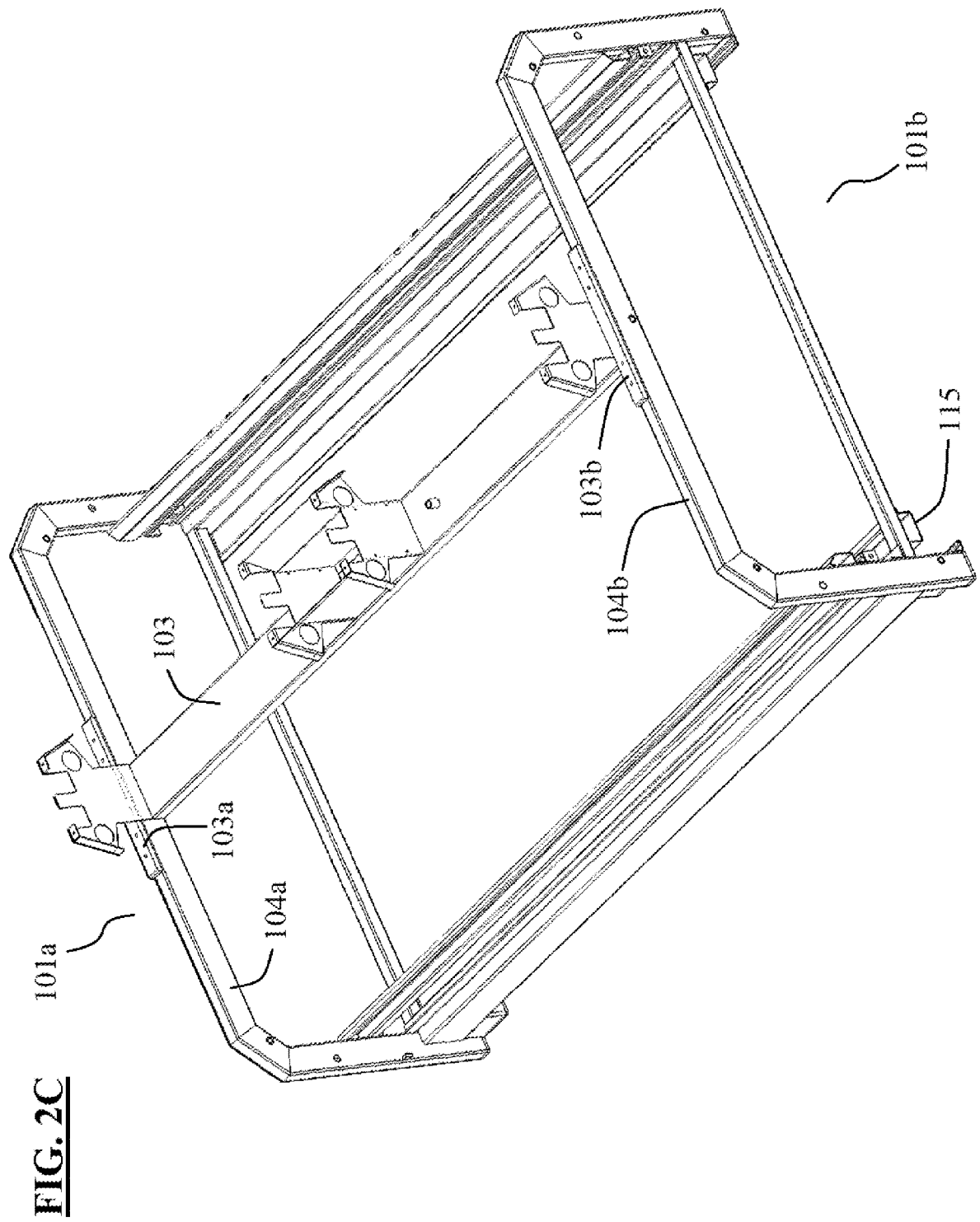
FIG. 2C provides a perspective view of a module support of a modular produce drying tunnel system, according to an embodiment of the present invention.

FIG. 2C provides a perspective view of a module support 102 of a drying module 101, the module support 102 comprising a central support 103, a plurality of couplings 104, a first end 101a, and a second end 101b. The first end may be the upstream end with respect to the movement of the conveyor, the second end 101b being the downstream end. The plurality of couplings 104 may comprise a first coupling 104a at the first end 101a of the module support 102, and a second coupling 104b at the second end 101b. Each access door 105 of the drying module 101 may be secured to an extension 103a of the central support 103 at the first end 101a, and an extension 103b of the central support 103 at the second end 101b. The central support 103 may run parallel with the direction of the conveyor 170 and positioned substantially directly above a central axis of the drying module 101, such that opening the access door 105 uncovers approximately half of the interior of the drying module 101.

Figure 2D:
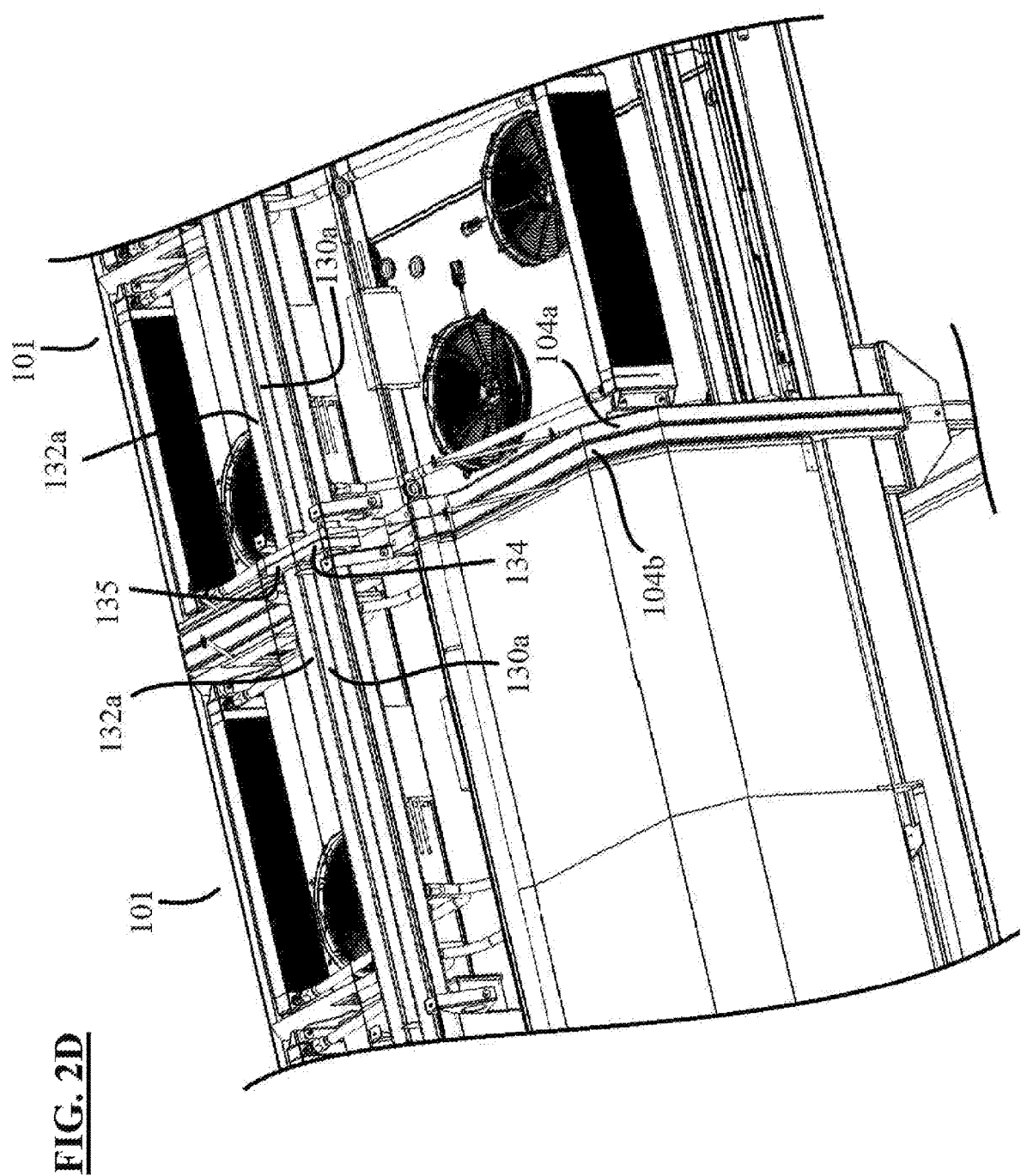
FIG. 2D provides a perspective view of a junction between drying modules of a modular produce drying tunnel system, according to an embodiment of the present invention.

As seen in FIG. 2D, each coupling 104a, 104b of the drying module 101 may be operable to securely connect in an airtight manner to a coupling of an adjacent drying module 101 (or loading module 150 or end module 160). The first end 101a may comprise the first coupling 104a and the second end 101b may comprise the second coupling 104b. The first coupling 104a may thus attach to a coupling of either an adjacent upstream drying module 101, or a loading module 150, and the second coupling 104b may attach to a coupling of either an adjacent downstream drying module 101 or an end module 160. The couplings 104a, 104b of adjacent drying modules 101 (or a drying module 101 and either a loading module 150 or an end module 160) may be secured together via at least one connector, the connector comprising a screw or a nut and bolt.

The water inlet conduit 130 and water outlet conduit 132 of the system 100 may each be modular, wherein each drying module 101 has a water inlet conduit module 130a and a water outlet conduit module 132a mounted to the central support 103. Each water inlet conduit module 130a may have a junction 134 operable to create a watertight seal with a junction 134 of an adjacent water inlet conduit module 130a mounted to an adjacent drying module 101, and each water outlet conduit module 132a may have a junction 135 operable to create a watertight seal with a junction 135 of an adjacent water outlet conduit module 132a mounted to an adjacent drying module 101.

Each drying module 101 may comprise at least one drip pan 109 mounted underneath the conveyor 170, the drip pan 109 being operable to catch droplets of moisture which fall from the produce and/or conveyor 170 as it passes through the drying module 101. Each drip pan 109 may comprise a drain hole 109a in fluid connection with a drain conduit 115 (see FIG. 2C) which leads to a waste water disposal system (i.e., a sewage pipe; not shown).

Figure 3A:
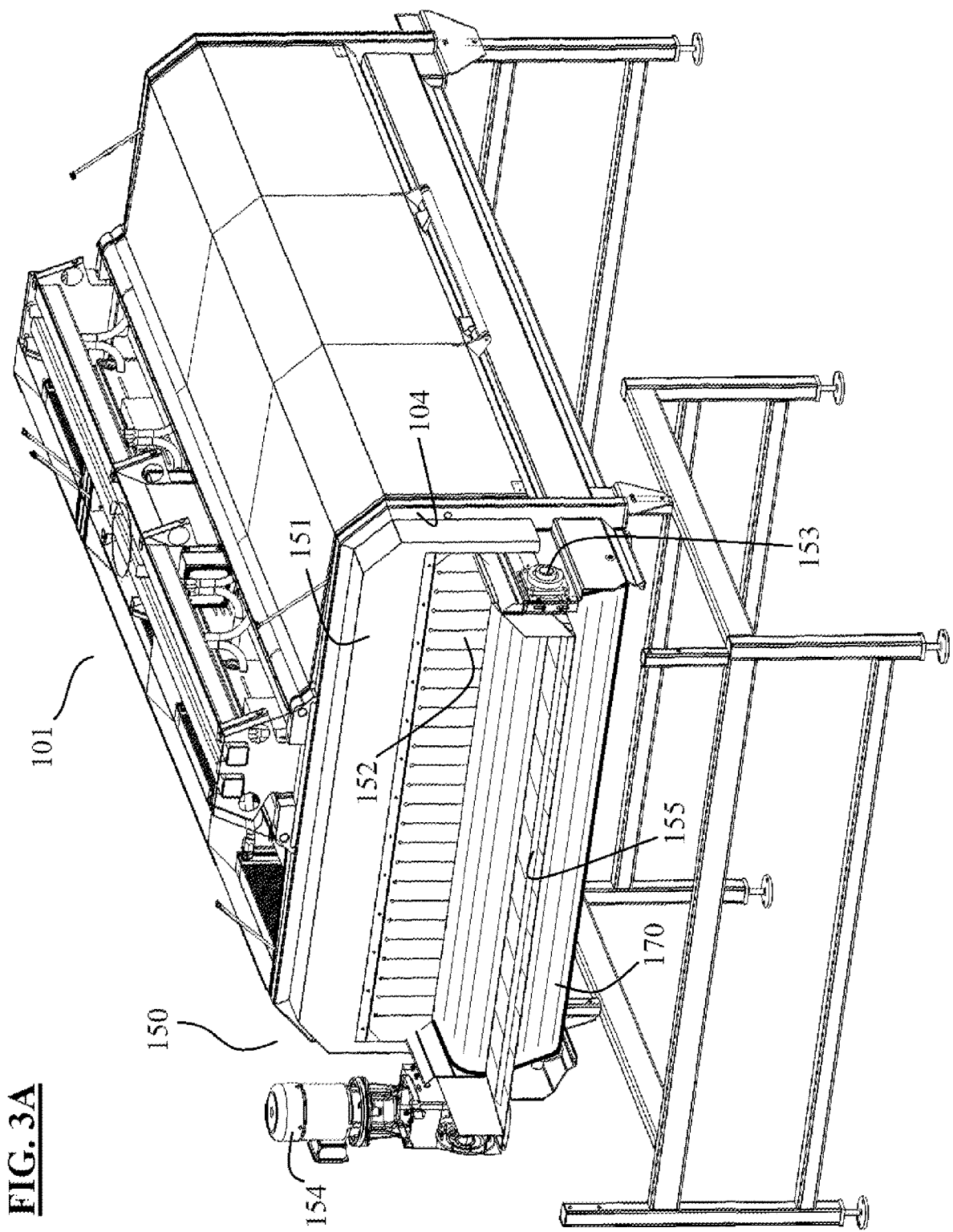
FIG. 3A provides a perspective view of a loading module of a modular produce drying tunnel system, according to an embodiment of the present invention.

FIG. 3A provides a perspective view of a loading module 150. The loading module 150 may comprise an outer shell 151 having a coupling 104 operable to be secured to a coupling 104 of an adjacent drying module 101, a barrier 152 disposed between the outer shell 151 and the conveyor 170, and a drive shaft 153 in mechanical connection with a motor 154 for powering the conveyor 170. The barrier 152 may be operable to allow produce to pass into an adjacent drying module 101 while substantially blocking air flow from passing into or out of the interior of the adjacent drying module 101. The barrier 152 may comprise a row of plastic strips secured to the shell 151 and hanging above the conveyor 170. The loading module may further comprise a loading shelf 155 for catching washed produce being loaded into the drying tunnel from a separate washing or conveying device, or produce being loaded by a user, and directing the produce to the conveyor 170. The conveyor 170 may comprise a belt having narrow openings to allow air and moisture to pass through while supporting the produce, the belt being substantially equal in width to the length of the drive shaft 153, and may be wrapped about both the drive shaft 153 of the loading module 150 and the tail shaft 163 of the end module 160.

Figure 3B:
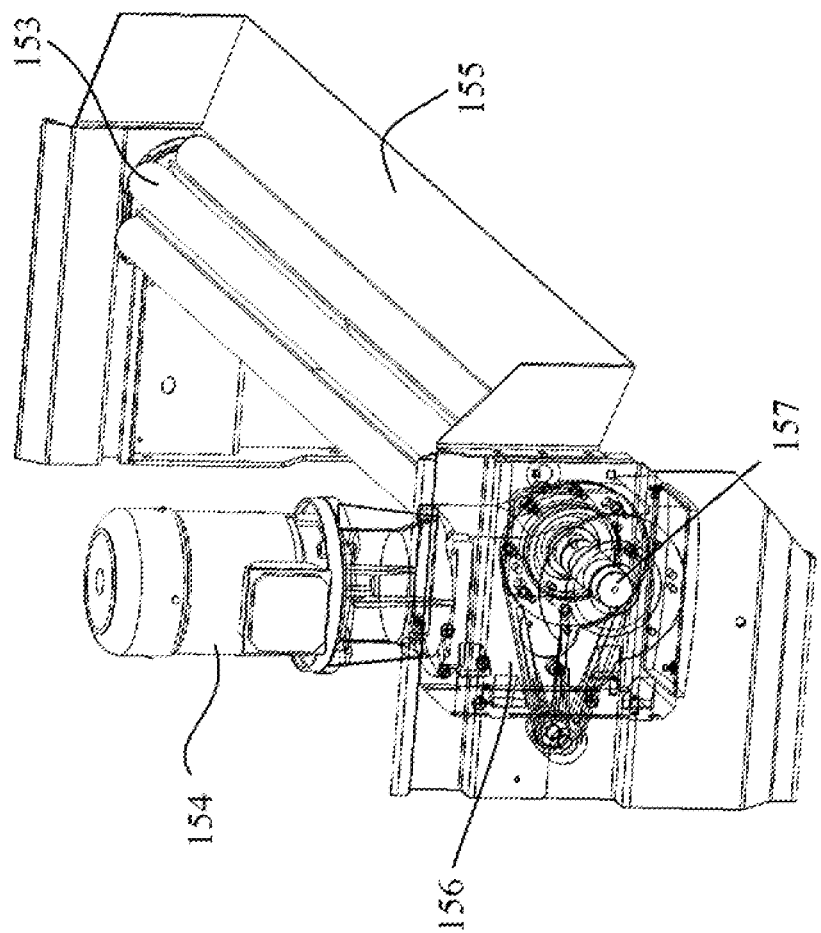
FIG. 3B provides a perspective view of elements of a loading module of a modular produce drying tunnel system, according to an embodiment of the present invention.

As shown in FIG. 3B, the motor 154 may comprise an electric motor and transmission 156 mechanically connected to the drive shaft 153 via an axle 157 (for clarity the transmission 156 is depicted as transparent and the conveyor 170 is not shown). The motor 154 may cause the drive shaft 153 to rotate, and the friction between an outer surface of the drive shaft 153 and an inner surface of the conveyor 170 may cause the conveyor to cycle (i.e., revolve) around the drive shaft 153 and tail shaft 163. The conveyor 170 may comprise a belt having widthwise ribs on an interior surface thereof, and the drive shaft 153 may comprise a plurality of cylindrical tubes arranged circumferentially about a longitudinal axis of the drive shaft 153, such that the ribs of the conveyor comprise a shape complementary to the spaces between the cylindrical tubes of the drive shaft 153, providing additional grip between the drive shaft 153 and the conveyor 170.

Figure 4:
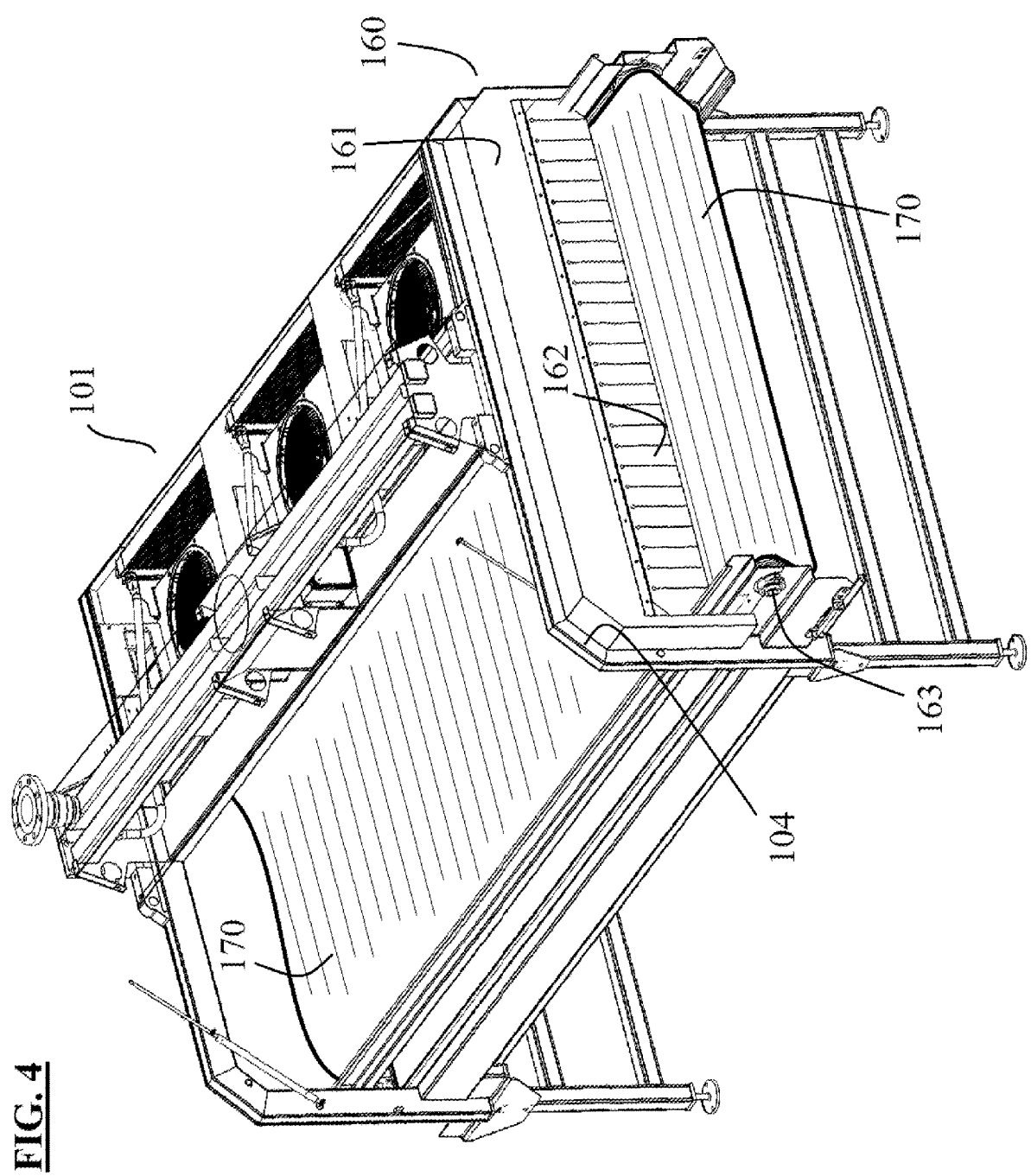
FIG. 4 provides a perspective view of an end module of a modular produce drying tunnel system, according to an embodiment of the present invention.

FIG. 4 provides a perspective view of an end module 160. The end module 160 may comprise an outer shell 161 having a coupling 104 operable to be secured to a coupling 104 of an adjacent drying module 101 (for clarity, the adjacent drying module 101 is shown without an access door 105 on one side and with a transparent access door shell 106 on the other side), a barrier 162 disposed between the outer shell 161 and the conveyor 170, and a free-spinning tail shaft 163 about which the conveyor 170 may be wrapped. The barrier 162 may be operable to allow produce to pass out of the drying tunnel while substantially blocking air flow from passing into or out of the interior of the adjacent drying module 101. The barrier 162 may comprise a row of plastic strips secured to the shell 161 and hanging above the conveyor 170.

The module 101 of the modular tunnel system 100 may be alternatively configured to apply various temperatures, including cooling temperatures to the interior of the module. For example, the element(s) 110 in at least one of the modules 101 in FIG. 1B may be connected to a cooled water source to allow cooled water to flow through the element to absorb heat present in the module 101 to dissipate heat from produce that had been dried by hotter conditions in upstream modules. In this manner, the tunnel system 100 may be used to both heat/dry and subsequently cool down produce passing therethrough.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed:

1. A modular tunnel system for drying produce, comprising:
   a. a loading module at a proximal end of said modular tunnel;
   b. a plurality of drying modules each having at least one access door that can be opened to allow access to the drying module for maintenance, wherein each drying module comprises a plurality of temperature control elements and a blower, wherein said drying module is operable to pass a temperature-controlled liquid through each of said temperature control elements to adjust a temperature within the drying module;
   c. an end module operable to discharge said produce;
   d. at least one conveyor passing through said modules; and
   e. a controller operable to adjust an amount of said temperature-controlled liquid passing through each of said temperature control elements in each of said drying modules independently to change a temperature within each of said drying modules.

2. The system of claim 1, wherein said at least one access door comprises a heat transfer chamber, said heat transfer chamber housing said temperature control element and said blower.

3. The system of claim 1, wherein opening said at least one access door uncovers approximately half of an interior of said drying module when opened.

4. The system of claim 1, wherein opening said at least one access door uncovers substantially all of an interior of said drying module.

5. The system of claim 2, further comprising a liquid inlet conduit and a liquid outlet conduit, and wherein said temperature control element adjusts the temperature in the heat transfer element by a rate of flow of liquid therethrough.

6. The system of claim 5, wherein said temperature control element comprises a valve for controlling said flow of liquid therethrough, wherein said valve is in electronic communication with said controller.

7. The system of claim 6, wherein said heat transfer chamber comprises a plurality of blowers.

8. The system of claim 1, wherein said plurality of drying modules connected in series via a plurality of couplings.

9. The system of claim 1, further comprising a control interface, and wherein a user can adjust a temperature in said at least one drying module, said loading module, and said end module individually using said control interface.

10. The system of claim 1, further comprising a control interface, wherein said plurality of temperature control elements are controlled independently through said control interface.

11. The system of claim 1, wherein each of said plurality of drying modules includes at least one blower in electronic communication with said controller, and said controller is operable to control a temperature in said module by controlling an amount of temperature-controlled liquid flowing through each of said plurality of temperature control elements and operation of said at least one blower.

12. The system of claim 11, wherein said controller is operable to vary an amount and rate of air moved by said blower.

13. A system for drying produce including a modular tunnel, said modular tunnel comprising:
   a. a loading module for loading produce into said modular tunnel, said loading module comprising a first barrier for substantially blocking a first air flow while allowing said produce to pass into said modular tunnel, a drive shaft for causing a conveyor to revolve, a motor for turning said drive shaft, and a loading shelf for directing said produce to said conveyor;
   b. a plurality of drying modules for drying said produce, each drying module comprising an access door, said access door providing access to at least approximately half of an interior of said drying module when open;
   c. a plurality of temperature control elements in each of said plurality of drying modules, each of said temperature control elements operable to pass a temperature-controlled liquid therethrough and a blower for blowing temperature-controlled air onto said produce, wherein a system controller is operable to control a temperature of said liquid independently in each of said plurality of temperature control elements; and
   d. an end module comprising a second barrier for substantially blocking a second air flow while allowing said produce to pass out of said modular tunnel and a free-spinning tail shaft for said conveyor to wrap around.

14. The system of claim 13, wherein said loading module connects to a drying module of said plurality of drying modules via a first coupling, two drying modules of said plurality of drying modules connect via a second coupling, and said end module connects to a drying module of said plurality of drying modules via a third coupling.

15. The system of claim 13, wherein said blower in electronic communication with said controller, and said controller is operable to control a temperature in said module by controlling an amount of temperature-controlled liquid flowing through each of said plurality of temperature control elements and operation of said at least one blower.

16. The system of claim 15, wherein said controller is operable to vary an amount and rate of air moved by said blower.

17. The system of claim 13, wherein said controller is operable to control the rate of flow of liquid through said at least two of said temperature control element at different rate in order change or maintain a target temperature in said tunnel modules.

18. A modular tunnel system for drying produce, comprising:
   a. a plurality of tunnel modules, each having an independent heat transfer chamber;
   b. each of said plurality of tunnel modules having an access door that can be opened to allow access to said tunnel module;
   c. a plurality of temperature control elements in each of said plurality of tunnel modules, each of said plurality of temperature control elements having an internal conduit operable to pass a liquid having a controlled temperature therethrough; and
   d. a controller operable to independently control the flow rate of said liquid through said plurality of temperature control elements of each of said plurality of tunnel modules.

19. The system of claim 18, wherein each of said plurality of temperature control elements is operable to pass a temperature-controlled liquid therethrough.

20. The system of claim 18, wherein each of said temperature control elements includes a liquid inlet conduit and a liquid outlet conduit, and wherein a temperature of said temperature control element is operable to be adjusted by adjustment of a flow of liquid therethrough.

21. The system of claim 20, wherein said temperature control element comprises at least one valve for controlling said flow of liquid therethrough, and said at least one valve is in electronic communication with said controller.

22. The system of claim 18, further comprising a control interface in electronic communication with said controller and operable to provide machine readable instructions to said controller, and wherein a user can adjust a temperature in each of said plurality of tunnel modules individually using said control interface.

23. The system of claim 22, wherein said control interface can be used by a human operator to control said temperature control element and said blower of each heat transfer chamber independently.

24. The system of claim 21, wherein each of said plurality of tunnel modules includes at least one blower in electronic communication with said controller, and said controller is operable to control a temperature in said module by controlling an amount of temperature-controlled liquid flowing through each of said plurality of temperature control elements and operation of said at least one blower.

25. The system of claim 18, wherein said controller is operable to control the rate of flow of liquid through each of said plurality of temperature control elements at different rates in order change or maintain a target temperature in said tunnel modules.

26. A modular tunnel system for drying produce, comprising:
   a. a plurality of tunnel modules, each having an independent heat transfer chamber;
   b. each of said plurality of tunnel modules having an access door that can be opened to allow access to said tunnel module;
   c. each of said plurality of tunnel modules having a plurality of independently controlled temperature control elements;
   d. a fluid inlet conduit and a fluid outlet conduit, and wherein said temperature control element adjusts the temperature in each of said temperature control elements by a flow of fluid therethrough; and
   e. a controller operable to independently control flow of said fluid through the fluid inlet conduit and the fluid outlet conduit to control each of said temperature control elements.

27. A modular tunnel system for drying produce, comprising:
   a. a plurality of tunnel modules;
   b. each of said plurality of tunnel modules having an access door that can be opened to allow access to said tunnel module;
   c. a plurality of independently-controlled temperature control elements in each of said tunnel modules each operable to pass a temperature-controlled liquid therethrough and to operate at independent temperatures within a tunnel module;
   d. a controller operable to independently control each of the temperature control the passage of liquid through elements of each of said plurality of tunnel modules; and
   e. a control interface in electronic communication with said controller and operable to provide machine readable instructions to said controller, wherein a user can adjust a temperature in each of said plurality of tunnel modules individually using said control interface.

* * * * *